United States Patent [19]

Maury

[11] 4,379,256

[45] Apr. 5, 1983

[54] APPARATUS AND METHOD FOR MEASURING THE SPEED OF A MOVABLE SYSTEM WITH RESPECT TO A DATA CARRIER

[75] Inventor: Christian Maury, Velizy, France

[73] Assignee: Compagnie Internationale Pour l'Informatique CII Honeywell Bull, Paris, France

[21] Appl. No.: 186,295

[22] Filed: Sep. 11, 1980

[30] Foreign Application Priority Data

Sep. 21, 1979 [FR] France ............................. 79 23580

[51] Int. Cl.³ .......................................... G05B 13/00
[52] U.S. Cl. .................................. 318/561; 318/341; 318/636; 318/571; 360/77
[58] Field of Search ............... 318/341, 636, 561, 571; 360/77, 78

[56] References Cited

U.S. PATENT DOCUMENTS

| | | | |
|---|---|---|---|
| 3,504,260 | 3/1970 | Staples | 318/341 X |
| 3,554,980 | 12/1970 | Applequist et al. | 340/174.1 |
| 3,629,560 | 12/1971 | Slawson | 318/571 X |
| 3,758,757 | 9/1973 | Buhler | 318/636 X |
| 4,030,132 | 6/1977 | Iftikar et al. | 360/78 |
| 4,031,443 | 6/1977 | Droux et al. | 318/561 |
| 4,109,184 | 8/1978 | Weber | 318/341 X |
| 4,166,970 | 9/1979 | Cardot et al. | 318/561 |

FOREIGN PATENT DOCUMENTS

| | | |
|---|---|---|
| 2094610 | 11/1972 | France . |
| 2172733 | 9/1973 | France . |
| 2336768 | 7/1977 | France . |
| 2337472 | 7/1977 | France . |
| 2349191 | 11/1977 | France . |

OTHER PUBLICATIONS

Hewlett-Packard Journal, vol. 23, 1972, pp. 6–11.
IBM Tech. Disc. Bulletin, vol. 9, pp. 1694–1695.
IBM Tech. Disc. Bulletin, vol. 19, p. 1884.

*Primary Examiner*—B. Dobeck
*Attorney, Agent, or Firm*—Lowe, King, Price & Becker

[57] ABSTRACT

The relative speed of a movable head and a magnetic disc memory for data recorded on a plurality of tracks, each having addresses written in a plurality of reference zones, is determined by reading the addresses read with the head at predetermined sampling times. The speed of the head is calculated as a function of the difference between the addresses read by the head and the interval between the sampling times.

10 Claims, 15 Drawing Figures

$$\theta = \frac{k_0}{2}T + \frac{T}{2} = (k_0+1)\frac{T}{2}$$

FIG. 8

APPARATUS AND METHOD FOR MEASURING THE SPEED OF A MOVABLE SYSTEM WITH RESPECT TO A DATA CARRIER

TECHNICAL FIELD

The present invention relates generally to devices and methods for measuring the speed of a movable system with respect to a data carrier and, more particularly, to a system and method wherein data addresses read by a head from the carrier are utilized to determine the speed.

BACKGROUND ART

In data processing systems, magnetic disc memories are very frequently used because they have high storage capacity and require a relatively short time for magnetic read/write heads to access a data item contained at any point on a disc from the moment an order is derived to access the data item. Magnetic discs used in such memories carry coded data in concentric circular recording tracks have a width no greater than a few hundredths of a millimeter. The recording tracks are situated on both faces of the discs. Data recorded in the tracks are usually coded in binary form.

Each individual track on a disc is assigned a serial number j, where j is an integer between zero and (N−1), where N is the total number of recorded tracks on a face of a disc. A binary coded expression of a serial number j for a particular track is referred to as the track address. Each track includes magnetic variations, representing binary values for the track addresses and for data recorded between the space provided for the addresses.

Data are read from or written into the tracks by magnetic heads that are positioned on each side of the discs, at a distance of a few tenths of a micron from the disc. To position the heads at a particular track address, the heads are driven radially relative to the disc, while the discs are driven at constant rotational speed by an electric motor.

In currently available magnetic disc memory systems, and, more particularly, in the case of disc memories including a limited number of discs, generally fewer than four or five, the data are arranged on the disc faces as follows. A large amount of space is reserved for data or information to be processed by the data processing system of which the memory is a part; for simplification, these data are referred to as "data to be processed". A relatively small amount of space is reserved for track addresses and for data used to control the position of the magnetic head or heads relative to the tracks. Hereafter, the track addresses and data for servo-controlling the position of the head are referred to as "track identifying data".

In the following discussion, for simplification, only one face of a disc is considered in combination with only one magnetic head. The magnetic head reads and/or writes both the data to be processed and the track identifying data. It is to be understood, however, that the principles of the invention are applicable to a system including multiple discs, each having two faces.

It is the present practice, as described, for example, in U.S. Pat. No. 4,151,571, for the data contained on each face of a disc to be distributed over equal and adjacent circular sectors $S_0, S_1 \ldots S_i \ldots S_{n-1}$. Generally, a disc face is divided into several tens of sectors, most often forty to fifty. As the face of a magnetic disc passes in front of or beneath a magnetic head associated with it, sector $S_0$ is read by the head before sector $S_1$, the sector $S_1$ before the sector $S_2$, etcetera. Thus, the nomenclature is that sector $S_0$ precedes sector $S_1$, which in turn precedes sector $S_2$, etcetera. Thus, if two data items $I_{k-1}$ and $I_k$ follow one another on the same track, having serial number j on the same face, data item $I_{k-1}$ precedes data item $I_k$ because data item $I_{k-1}$ is read by the head before data item $I_k$; conversely, data item $I_k$ is said to follow data item $I_{k-1}$. The same reasoning is applicable for several data groups $G_k$ and $G_{k-1}$.

Each sector $S_i$ is divided into a relatively large area and a relatively small area. The large area of each sector $S_i$ includes the data to be processed, while the smaller area includes the track identification data. The smaller area of each sector is divided into several zones, referred to as "reference zones"; the number of reference zones on each disc is equal to the number of tracks on the disc, such that each track is associated with one and the same zone.

Binary ones and zeros are designated as "bits". Binary bits can be represented as magnetic variations in a track or as analog or binary electric signals. Binary or logic signals are capable of assuming only one of two values, while an analog signal is defined as a signal that can vary continuously between two positive and/or negative limit values. For simplification, any data item contained on a magnetic disc is designated in the present specification and claims as a bit. In particular, data items for identifying tracks are referred to as "track reference bits", while data items to be processed are referred to as "processed data bits".

To minimize the time required by the magnetic head to access any item of data to be processed, it is necessary for the head to move from one track to another in the shortest possible time. It is also necessary for the head to be positioned precisely with respect to the track. One type of system having a relatively short accessing time employs a voice coil type, electro-dynamic motor which is operated in a "bang-bang" mode of operation. The voice coil motor includes a coil that is linearly displaced within a cylindrically shaped permanent magnet. The coil is mechanically connected by a suspension arm to a carriage for the magnetic head. The magnetic head is driven through an acceleration phase, followed by a deceleration phase, whereby the head is displaced and accurately positioned at a desired track. During the acceleration phase, a constant current of one polarity is applied to the voice coil. The constant current causes the speed of the carriage and of the heads to increase as a linear function of displacement time. Because of the linear increase in speed of the carriage and head, the position of the carriage and head, as a function of time, is represented as an ascending arc of a parabola.

During the deceleration phase, a constant current of the opposite polarity is applied to the voice coil. The speed of the carriage therefore decreases as a linear function of time, while the position of the carriage and head, as a function of time, is represented as a descending arc of a parabola. Upon the completion of the deceleration phase, the carriage speed and the distance which remains for it to traverse to the desired location on the track should be sufficiently small for the head to be stopped above the selected track. A preferred configuration for traversing the heads in the described manner is disclosed in commonly assigned, U.S. Pat. No. 4,166,970.

In the apparatus and method disclosed in U.S. Pat. No. 4,166,970, the address of a track is the only data controlling the magnitude of the current supplied to the voice coil which drives the read/write head. The read/write head is displaced from an initial track A to a desired track B, the addresses of which are derived by a circuit for controlling addresses of the disc associated with the particular head. During the acceleration phase, the motor is supplied by a constant current as the head traverses from track A to track C, between tracks A and B. When the head arrives at track C, the current is reversed and the deceleration phase occurs.

In the method of U.S. Pat. No. 4,166,970, the track addresses are recorded on the discs in reflected binary, i.e., Gray, code. The address of track C is calculated as a function of the addresses of tracks A and B, with all three addresses being expressed in weighted binary or standard code. As the magnetic head is displaced, it reads track addresses which are stored and converted into weighted binary code. During the acceleration phase, the converted addresses are compared with the calculated address of track C. In response to track address C being read by the magnetic head, the deceleration phase is entered. The deceleration phase subsists until the speed of the head and carriage, i.e., movable system, is less than a minimum threshold $V_0$, as calculated from the read and converted addresses. In response to the speed of the movable system being less than the minimum threshold $V_0$, addresses of the tracks read by the magnetic head are read and compared with track address B. In response to the read track address being equal to track address B, the movable system is immobilized. A new displacement takes place if the read address differs from the address of track B.

Because of the importance of determining the speed of the movable system, including the heads, the speed of the movable system must be known, particularly as the head is approaching the destination track. In the prior art, the speed of the movable system is measured by electromechanical transducers which derive analog signals having amplitudes proportional to head speed. Exemplary of the mechanical transducers are a coil carried axially of the electro/dynamic linear motor which drives the movable system. As such, transducers are associated with analog circuitry. It has been found, however, that the electromechanical transducers and associated analog circuitry are not sufficiently accurate, in many instances, and have the disadvantage of being relatively costly and cumbersome.

It is, accordingly, an object of the present invention to provide a new and improved apparatus and method for determining the speed of a movable system with respect to a data carrier.

Another object of the invention is to provide a new and improved system and method for measuring the speed of a head reading magnetic data from a dynamic record medium.

A further object of the present invention is to provide a relatively inexpensive, accurate and uncumbersome device for determining the velocity of a movable system, including a magnetic read head responsive to addresses recorded on a dynamic magnetic record medium.

A further object of the invention is to provide a new and improved apparatus and method for deriving an indication of the speed of a magnetic read head relative to a dynamic magnetic medium containing addresses, wherein only digital circuits are used to determine the speed of the head.

An additional object of the invention is to provide a new and improved apparatus for and method of determining the speed of a magnetic transducer head which reads addresses from a dynamic storage medium, wherein the addresses are utilized to determine the speed of the head relative to the medium.

Yet a further object of the invention is to provide a new and improved method and device for measuring the speed of a magnetic head relative to a magnetic disc carrying addresses that are read by the head and processed to derive an indication of the speed.

THE INVENTION

In accordance with the present invention, an apparatus and method for measuring the speed of a movable system with respect to a data carrier is determined from addresses read by the head at precisely defined time intervals. The device of the invention is simple and easy to operate and obviates the need for analog transducers and measuring circuits, as it utilizes logic circuits almost exclusively. In one application, the speed measuring device for the present invention is utilized in the co-pending, commonly assigned application entitled "Apparatus For And Method Of Displacing A Movable System With Respect To A Data Carrier", filed concurrently herewith.

The apparatus and method disclosed in the copending, concurrently filed application is directed to displacing a movable system with respect to a carrier for data recorded on a number of tracks. The addresses of the tracks are written on the carrier, preferably a magnetic disc, in a number of reference zones, the number of which is at least equal to the number of tracks. Each track is associated with at least one zone. The movable system is linearly translated by an electric motor and includes at least one data reading head which is displaced from an initial track to an arrival or destination track. The track addresses are read by the head and designated as $ADL_j$. The movable system is servo-controlled according to a non-linear equation of the type:

$$f(\epsilon_1) + d\epsilon_1/dt + 1/C_2 d^2\epsilon_1/dt^2 = 0 \tag{1}$$

where $\epsilon_1 = AD_f - ADL_j$, $C_2$ is a constant, and $f(\epsilon_1)$ is an increasing non-linear function of $\epsilon_1$.

The method of the concurrently filed application involves activating the motor by calculating a deviation $\epsilon_1$ at predetermined sampling times. In response to the deviation $\epsilon_1$, a non-linear function $f(\epsilon_1)$ is determined. At the same sampling times, the speed, $-v = d\epsilon_1/dt$ is calculated as a function of the difference in addresses read at the predetermined sampling times, and the time interval between the sampling times. An instruction or set acceleration is calculated as:

$$\gamma_c = -C_2(f(\epsilon_1) + d\epsilon_1)/dt. \tag{2}$$

Then the actual movable system acceleration $\gamma$ is measured, preferably in response to an analog parameter of the motor. An error between the set and measured acceleration is determined as $\gamma_c - \gamma$. The motor for driving the movable system is responsive to a function of this difference.

Thus, the present invention is particularly applicable for use with a movable system driven by a motor and including a carriage, suspension arm and magnetic read head for a data carrier. On the data carrier are a number of tracks having addresses that are written in a number of reference zones. The number of reference zones is equal at least to the number of tracks and each track is associated with at least one zone. The apparatus of the invention includes means for determining, at predetermined precisely controlled time intervals, the addresses read by the head. The speed of the movable system is calculated at each of these sampling times as a function of the difference in the addresses and the interval between the sampling times.

Preferably the means for calculating the speed v of the movable system includes means for calculating a measured speed $v_m$ of the movable system as a function of the difference in the addresses $ADL(nT+k_0T)$ and $ADL(nT)$ read at sampling times designated as $t_n=nT$ and $t_{k0}=nT+k_0T$, where $k_0$ and n are integers and the sampling times are separated by time intervals equal to T seconds. The speed calculating means also includes a device for compensating the average delay, $\theta$, in estimating the measured speed $v_m$ with respect to the speed v of the movable system. The compensating device derives a signal $\gamma_F$, such that $(v_m+\gamma_F)$ is approximately equal to the speed v of the movable system. It can be shown that the measured speed $v_m$ at time $t_{k0}$ is usually not equal to the actual speed at time $t_{k0}$. Instead the measured speed at time $t_{k0}$ is equal to the actual speed at time $(t_{k0}-\theta)$. To provide compensation for this delay, the measured speed $v_m$ and the compensation signal $\gamma_F$ are added together.

It is, therefore, another object of the invention to provide a new and improved apparatus for and method of determining the speed of a magnetic head relative to a medium containing addresses read by the head and from which addresses the speed of the system is determined, and wherein compensation is provided for delay introduced in determining the speed of the system from the addresses.

The above and still further objects, features and advantages of the present invention will become apparent upon consideration of the following detailed description of several specific embodiments thereof, especially when taken in conjunction with the accompanying drawings.

BEST MODE FOR CARRYING OUT THE INVENTION

To provide a better understanding of the principles of the present device, relating to an apparatus for and method of displacing a movable system with respect to a recording carrier in the form of a magnetic disc, it is useful to review the manner in which data are recorded on a magnetic disc in the prior art. To this end, reference is made to FIGS. 1a-1e wherein the layout of the data is illustrated. A preferred manner of writing data within reference zones of the magnetic disc illustrated in FIGS. 1a-1e is indicated by the illustrations in FIGS. 2a-2c.

Figure 1A:
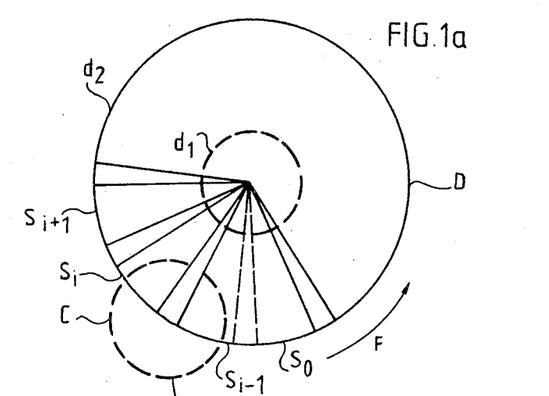
FIGS. 1a-1e are topological diagrams including schematic illustrations of the manner in which data are arranged in a preferred embodiment of the present invention on a magnetic disc.
Figures 1B, 1C:
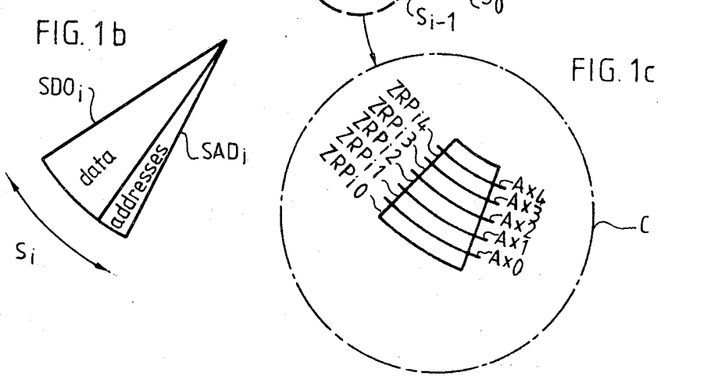
Figure 1D:
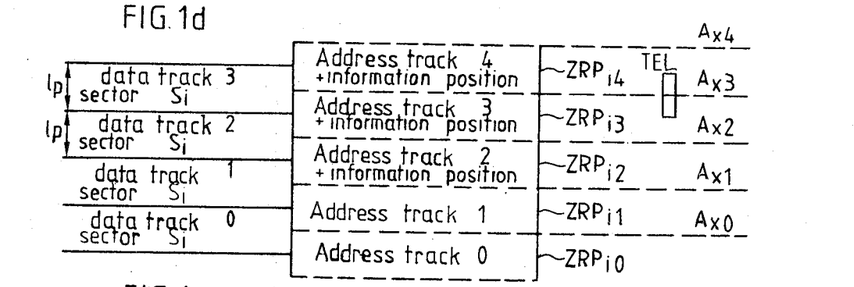

In FIG. 1a, a magnetic disc D is assumed to be turning about its center, in the direction of arrow F. Disc D includes a useful recording surface between concentric circles $d_1$ and $d_2$, from which data are read by a single magnetic read/write head TEL, FIG. 1d. On disc D there are defined $n_0$ equal and adjacent circular sectors $S_0, S_1 \ldots S_i \ldots S_{n0-1}$. Each sector $S_i$ is divided into a relatively large region $SDO_i$ and a relatively small region $SAD_i$, on which are respectively recorded the data to be processed and track addresses. As illustrated in FIGS. 1c and 1d, address segments $SAD_i$ of sector $S_i$ are divided into N zones $ZRP_{10} \ldots ZRP_{ij} \ldots ZRP_{i(N-1)}$, where N is the number of magnetic tracks on disc D. While only five zones $ZRP_{i0}-ZRP_{i4}$ are illustrated in FIGS. 1c and 1d for simplification, it is to be understood that there are several tens of zones on a particular disc. The boundaries between different zones $ZRP_{ij}$ are circular axes $Ax_j$ of adjacent magnetic recording tracks. Zone $ZRP_{ij}$ is associated with magnetic tracks having serial number j on axis $Ax_j$. Thus, reference zone $ZRP_{i0}$ is associated with the track having serial number 0, while reference zone $ZRP_{i1}$ is associated with the track having serial number 1, etcetera.

The magnetic read and/or write heads which cooperate with disc D include a magnetic circuit including a magnetic core on which is disposed a winding that extends across an air gap. To read and write the data to be processed from a track of serial number j of magnetic axis $Ax_j$, magnetic head TEL remains stationary with respect to the track while data are read from the track. It is necessary for the air gap to be perfectly centered on magnetic axis $Ax_j$, the boundary between reference zones $ZRP_{ij}$ and $ZRP_{i(j+1)}$. Thus, when disc D has been rotated so that head TEL is above a reference zone, the head straddles reference zones $ZRP_{ij}$ and $ZRP_{i(j+1)}$.

Figure 1E:
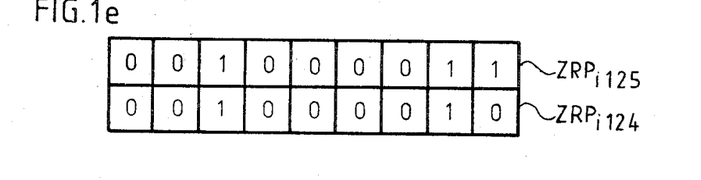

To simplify FIG. 1d, reference zones $ZRP_{ij}$ are represented as rectangles instead of arcuate regions. Each of reference zones $ZRP_{ij}$ contains the address of the track with which it is associated. Zone $ZRP_{i0}$ contains the address of the track having serial number 0, zone $ZRP_{i1}$ contains the address of the track having serial number 1, zone $ZRP_{i2}$ contains the address of the track having serial number 2, etcetera. The track addresses are written in reference zone $ZRP_{ij}$ in reflected binary code, frequency referred to as Gray code. The Gray code is well known and a description thereof appears, for example, in a book written by H. Soubies-Camy, published by Editions Dunod, 1961, pages 253 and 254. The Gray code for two successive addresses, those associated with tracks 124 and 125, are illustrated in FIG. 1e as 001000010 and 001000011, respectively. Thus, the Gray code for tracks 124 and 125 differ from each other by only one bit, namely the last bit, which is equal to zero for track 124 and equal to one for track 125.

Figure 2A:
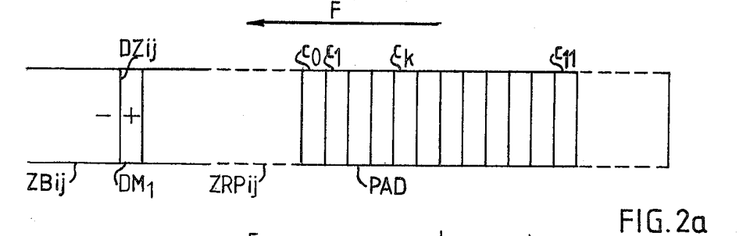
FIGS. 2a-2c are schematic diagrams indicating the manner in which data are recorded in cells in accordance with the invention and of a waveform derived from a head reading a cell.

Reference is now made to FIG. 2a wherein there are schematically illustrated individual cells forming a reference zone $ZRP_{ij}$ of a sector $S_i$. It is assumed that the disc containing the cells illustrated in FIG. 2a is moving from right to left relative to a magnetic head, as indicated by arrow F. As described in copending, commonly assigned, U.S. application, Ser. No. 076,332, filed Sept. 17, 1979, entitled "Method Of Writing Information On A Magnetic Recording Medium", the track address is contained in part PAD of zone $ZRP_{ij}$. The rest of zone $ZRP_{ij}$ principally contains data for servo-controlling the position of head TEL on axis $Ax_j$ of the track having serial number j. Reference zone $ZRP_{in}$ is preceded by zone $ZRP_{ij}$, referred to as a "wide zone" which separates the reference zone from segment $SDO_i$ of sector $S_i$, containing data to be processed. In zone $ZB_{ij}$, the magnetic induction is constant, for example, at a negative value, as indicated in FIG. 2a. In response to relative movement between zone $ZB_{ij}$ and head TEL, while the head is positioned above reference zone $ZRP_{ij}$, the head derives a zero output signal.

To record data on a magnetic disc, a succession of small magnetic barriers, having dimensions on the order of a few microns, referred to as "elementary areas" are created on each disc track. These areas are of variable length and are distributed over the entire track length and include alternate magnetic inductions of the same value, but of opposite polarity, in a direction parallel to the disc surface.

The start of reference zone $ZRP_{ij}$ is indicated by line $DZ_{ij}$, that defines a change in magnetic induction polarity between negative induction zone $ZB_{ij}$ and a positive magnetic induction area $DM_1$ of zone $ZRP_{ij}$. In the remainder of the specification and claims of the present application, a change in magnetic induction direction is referred to as a "magnetic transition".

A magnetic transition can be of two different types. A first type of magnetic transition occurs when the face of the magnetic disc travels beneath the magnetic head TEL, whereby the head is exposed to successive elementary magnetic areas of negative and positive induction; the corresponding magnetic transition is referred to as positive. A magnetic transition is defined as being negative if head TEL is exposed to successive elementary positive and negative induction areas.

Figure 2B:
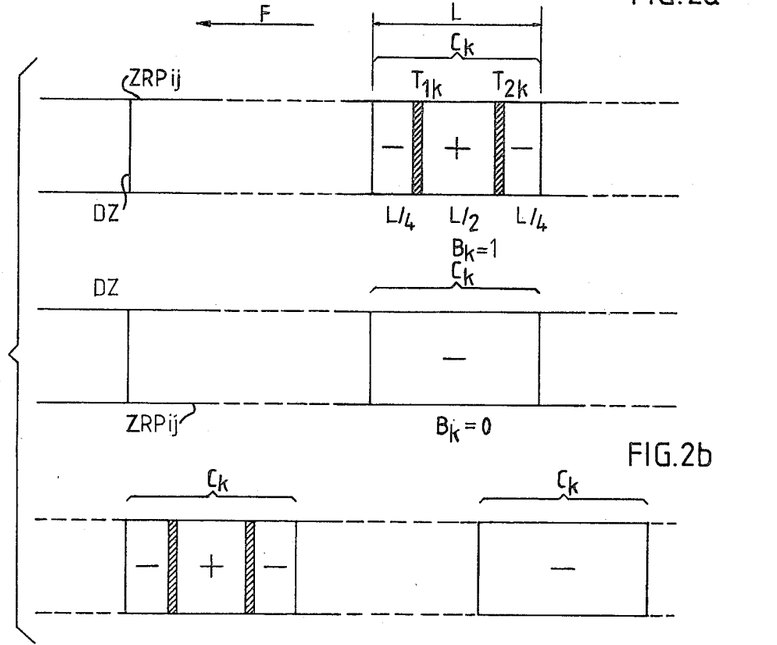

Segment PAD of zone $ZRP_{ij}$, where the address of the zone is located, includes m identical elementary cells, each having an identical length L; in the embodiment illustrated in FIG. 2a, twelve such cells are illustrated and denominated as $C_0, C_1 \ldots C_k \ldots C_{11}$. Each cell of segment PAD contains one address bit. Any address $B_k$ contained in a cell is defined by the presence or absence of a double magnetic transition. The first magnetic transition $T_{1k}$ is of an opposite polarity to the second transition $T_{2k}$. For example, the first transition $T_{1k}$ is positive, while the second transition $T_{2k}$ is negative, as illustrated in FIG. 2b. The address bits $ADE_j$ of a track having serial number j of reference zone $ZRP_{ij}$ are coded, for example, such that bit $B_k$ is equal to a binary one, in the case of the presence of a double magnetic transition. If bit $B_k$ has a value equal to zero, the double magnetic transition is missing and there is a uniform magnetic induction across the length of the cell. For simplification, in the following description and claims, the absence and presence of a double magnetic transition are designated by the term "dibits".

Figure 2C:
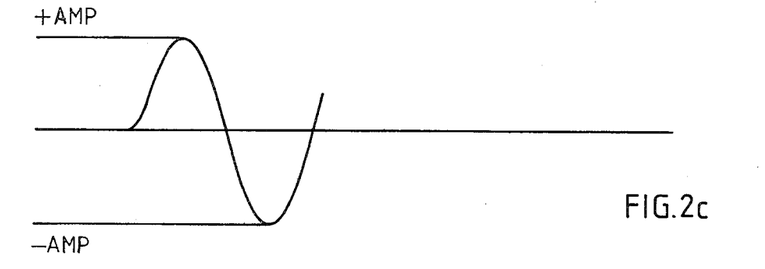

In FIG. 2c are illustrated the analog signals derived by magnetic head TEL in response to cell $C_k$ having binary one and zero values. In response to cell $C_k$ having a binary one value, as indicated by the dibit on the left side, which includes two transitions, head TEL derives two analog pulses of opposite polarities and equal amplitudes, +AMP and −AMP, respectively. In response to the value of cell $C_k$ indicating a binary bit value of zero, as indicated by the right portion of FIG. 2b, head TEL derives its zero value, as indicated in the right portion of FIG. 2c.

Figure 3:
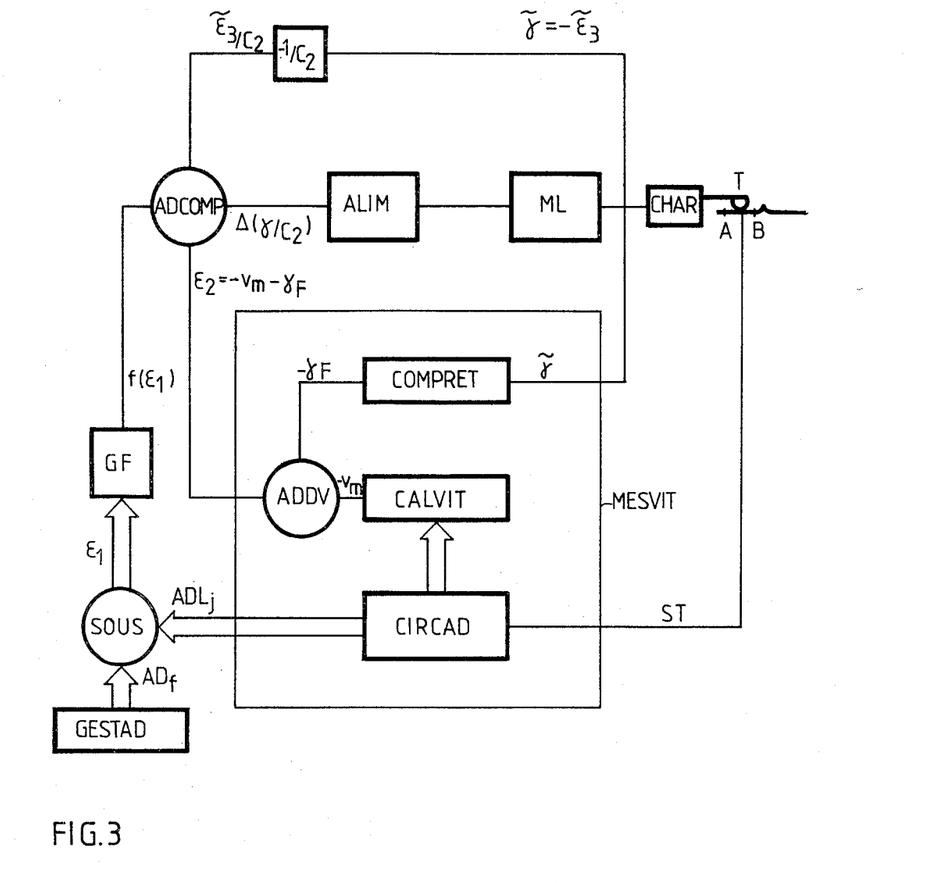
FIG. 3 is a general block diagram of a speed measuring device according to a preferred embodiment of the invention, in combination with a device for displacing a movable system with respect to a data carrier, such as that described and claimed in the copending, commonly assigned application filed today bearing the title "Apparatus And Method For Displacing A Movable System With Respect To A Data Carrier"

Reference is now made to FIG. 3 of the drawing wherein there is illustrated a device for measuring the speed of a movable system SYSMOB with respect to a data carrier D according to a preferred embodiment of the invention. In the preferred embodiment, movable system SYSMOB includes magnetic read/write head TEL mechanically coupled to a carriage CHAR, and data carrier D is a magnetic disc including concentric data tracks, as illustrated in FIGS. 1 and 2. The speed measuring device of the invention is preferably included in a device for displacing system SYSMOB with respect to disc D. System SYSMOB displaces in a single course, in a minimum time interval, head TEL from an initial or departure track A to an arrival or final track B; the arrival track has an address $AD_f$. The movement of head TEL is controlled by the non-linear second order differential equation (1), defined supra, as well as the values of $f(\epsilon_1)$, $\epsilon_1$ and $C_2$. To simplify the exposition, it is assumed that $$\epsilon_2 = d\epsilon_1/dt = -V, \quad (3)$$

where
v = the speed of head TEL,
$\epsilon_3 = d^2\epsilon_1/dt^2 = -\gamma$, and
$\gamma$ = the acceleration of head TEL.

Movable system SYSMOB is displaced with respect to a face of disc D by performing the following operations:

(1) at predetermined sampling times, spaced from each other by T, the address $ADL_j$ of head TEL is determined and the deviation $\epsilon_1$ is calculated;
(2) in response to the calculated value of $\epsilon_1$, a non-linear function of $\epsilon_1$, $f(\epsilon_1)$ is determined for each sampling time;
(3) the speed v of system SYSMOB is calculated as a function of the difference of the addresses $ADL(nT+k_0T) - ADL(nT)$, respectively read at the sampling times $t_n = nT$ and $t_{k0} = nT + k_0T$, where n and k are integers;
(4) the magnitude of the acceleration order or instruction $\gamma_c/C_2 = (f(\epsilon_1) - v)) = f(\epsilon_1) + \epsilon_2$ is calculated;
(5) the acceleration $\overline{\gamma}$ of system SYSMOB is determined and divided by $C_2$;
(6) the difference $(\gamma - \gamma_c)/C_2 = \Delta(\epsilon_3)/C_2 = \Delta(\gamma/C_2)$ is calculated;
(7) the coil of a linear electro-dynamic motor ML is supplied by a constant voltage, having a polarity dependent upon the polarity of the difference $(\overline{\gamma}-\gamma_c)/C_2$.

The apparatus of FIG. 3 for performing the stated method and which includes apparatus for measuring the speed of the system according to the invention is illustrated in FIG. 3 as including a linear electro-dynamic motor ML, in combination with a circuit GESTAD for deriving the final addresses $AD_f$ as a multibit, parallel binary signal. A network MESVIT responds to a signal ST derived from head TEL to derive, every T seconds, a digital signal indicative of the actual address of head TEL, and an analog signal which represents the deviation function $\epsilon_2$. Network MESVIT is also respective to an analog signal directly proportional to the acceleration of system SYSMOB, $\gamma$, as derived by monitoring the current supplied to motor ML.

The actual, measured acceleration of system SYSMOB, as derived by monitoring the current supplied to motor ML is appropriately scaled and combined with a signal representing an order or set value for acceleration in adder/comparator ADCOMP. To this end, the analog output signal $\gamma$ is multiplied by an analog multiplier X, which derives an analog output signal $\epsilon_3/C_2$, representing the measured acceleration of the system. An acceleration instruction for the system is derived by combining a multibit digital output signal that network MESVIT derives every T seconds and represents the address, $ADL_j$, read by head TEL, with the destination address $AD_f$, as derived from network GESTAD. Signals $ADL_j$ and $AD_f$ are subtractively combined in binary subtractor SOUS, which derives, every T seconds, a multibit binary output signal representing the separation $\epsilon_1$. The multibit $\epsilon_1$ representing output signal of subtractor SOUS is supplied to function generator GF which includes a digital to analog converter that derives an analog output signal having a magnitude and polarity representing a non-linear function $f(\epsilon_1)$ of $\epsilon_1$. The magnitude of the output signal of function generator GF is combined with an analog output signal of network MESVIT representative of the deviation $\epsilon_2$. The analog signals proportional to $\overline{\epsilon}_3/C_2$, $f(\epsilon_1)$ and $\epsilon_2$ are combined in adder/comparator ADCOMP which supplies an error signal to voltage supply generator ALIM.

Network MESVIT for measuring speed according to the invention includes a circuit CIRCAD responsive to the signal ST derived from head TEL for determining the address read by the head as a multibit digital signal that is derived every T seconds and has a value $ADL_j$. The output signal of circuit CIRCAD indicative of $ADL_j$ is supplied to calculator CALVIT for deriving an analog signal representing the speed of system SYSMOB relative to disc D. To compensate for the average delay $\theta$ in the output signal of calculator CALVIT, due to the sampling nature of circuit CIRCAD, the $\overline{\gamma}$ signal supplied to network MESVIT is coupled to delay compensation device COMPRET, whereby analog output signal $-\gamma_F$ of device COMPRET is delayed in time approximately by the same amount as the time delay between the output signal of the calculator CALVIT and a signal read by head TEL. The analog output signals of delay compensation device COMPRET and calculator CALVIT are combined in analog adder ADDV.

Circuit CIRCAD is responsive to the analog signal ST derived by magnetic read/write head TEL in response to data dibits contained in part PAD of zone $ZRP_{ij}$ moving past the head. Signal ST is composed of a set of analog pulses as indicated supra in connection with FIG. 2. Circuit CIRCAD transforms the analog pulses in signal ST into a set of binary pulses which represent in Gray code address $ADG_j$ of the track of serial number j associated with reference zone $ZRP_{ij}$ being read by head TEL. Circuit CIRCAD then converts the Gray code address $ADG_j$ into an address $ADL_j$, in standard or weighted binary code of the type described in the previously mentioned book by H. Soubies-Camy. Circuit CIRCAD responds to the weighted binary coded addresses $ADL_j$ and supplies these addresses to subtractor SOUS and calculator CALVIT at a sampling frequency $F=1/T$, where $T=$ the time required for the passage of parts PAD of two adjacent reference zones $ZRP_{ij}$ and $ZRP_{(i+1)j}$, associated with the same track having serial number j. Thus, the addresses $ADL_j$ are derived by circuit CIRCAD every T seconds.

Figure 7:
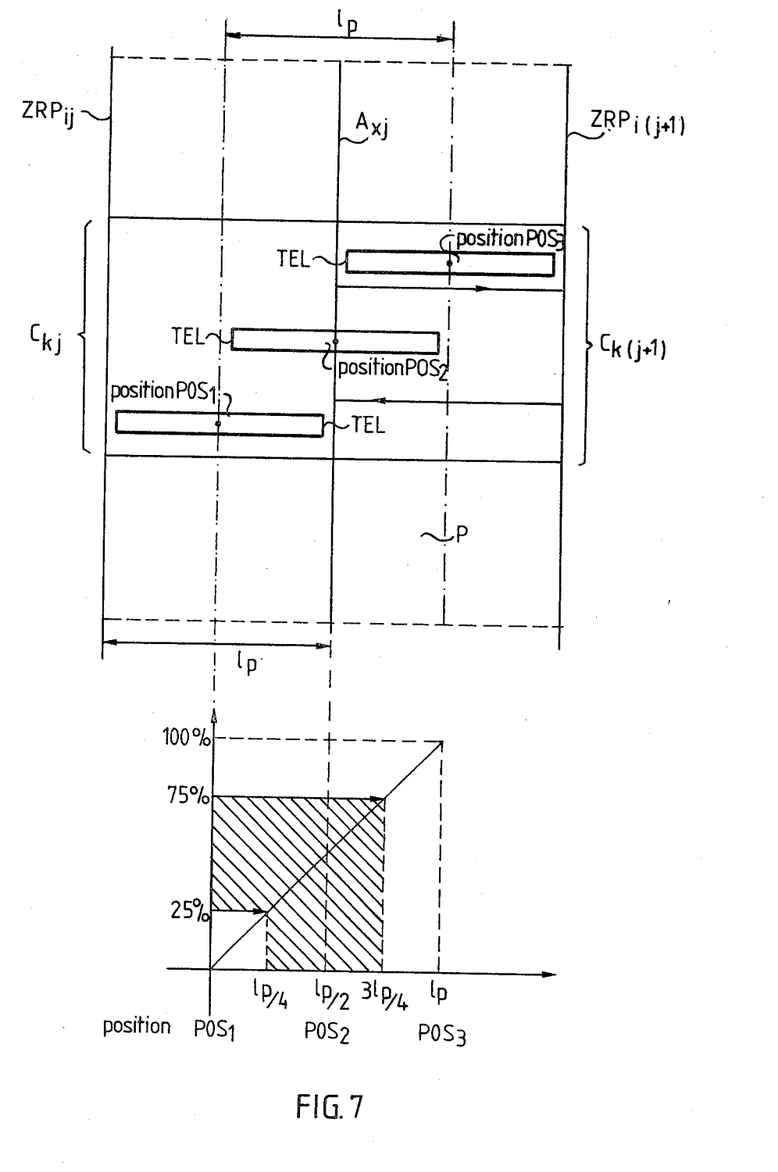
FIG. 7 is a schematic illustration of the accurate manner in which the address $ADL_j$ of a track having serial number j is determined.

Speed calculator CALVIT derives a signal representing the speed of system SYSMOB by responding to addresses $ADL(nT)$ and $ADL(nT+k_0T)$ respectively derived from circuit CIRCAD at time $t_n=nT$ and $t_{k0}=(nT+k_0T)$. The distance between addresses $ADL(nT+k_0T)$ and $ADL(nT)$ is equal to 1q, where 1 is an integer and q is a distance equal to a fraction of the length of a track. Because all tracks of disc D have approximately the same width 1p (see FIGS. 1d and 7), $q=f.1p$, where f is between zero and one, and q represents the position of a read address. Thus, in the specifically described embodiment q equals a half track width, i.e., $q=0.5.1p$. Thus, if an address $ADL_j$ corresponding to a track of serial number j is read, head TEL is positioned to face the track of serial number j, approximately one-half way across the track. The quantity 1q therefore represents the distance covered by head TEL during a time interval equal to $k_0T$ seconds.

Calculator CALVIT determines the speed of system SYSMOB, $v_m$, according to the formula $v_m=1q/k_0T$. The measured or calculated speed $v_m$ is a signal which is reversed in polarity and coupled in analog form to adder ADDV.

As indicated infra, the measured, calculated speed at the instant $t_{k0}=(nT+k_0T)$ is not equal to the actual speed v of head TEL relative to disc D at the instant $t_{k0}$, but is equal to the head speed at the time $((nT+k_0T)-\theta)$, where $\theta$, the average estimated delay, equals $(k_0+1)T/2$. Device COMPRET, included in network MESVIT, compensates for the effects of the average estimated delay $\theta$ on the measured speed $v_m$. Device COMPRET responds to signal $\overline{\gamma}$, to derive a compensated, delayed signal $\gamma_F$. Delay compensation device COMPRET thus comprises an analog delay or low pass filter circuit having a delay time such that the speed deviation $\Delta v$ between the actual speed v and the estimated speed $\overline{v}$ is minimum, i.e., $\Delta v=v-\overline{v}=v-v_m=\gamma_F$, where $\overline{v}=v_m+\gamma_F$. Thus, the estimated speed $\overline{v}$ is approximately equal to the actual speed v of magnetic read/write head TEL. The speed deviation $\Delta v$ is minimized if $\gamma_F=\overline{\gamma}.G$, where G is the low pass filter transfer function of device COMPRET. Device COMPRET derives an analog output signal having a value porportional to $\gamma_F$. Signal $\gamma_F$ is reversed in polarity and supplied to adder ADDV, which derives an analog signal having a magnitude representing $-(v_m+\gamma_F)=v=\epsilon_2$. The analog output signal of adder ADDV is supplied to one of the inputs of adder comparator ADCOMP.

Figure 4:
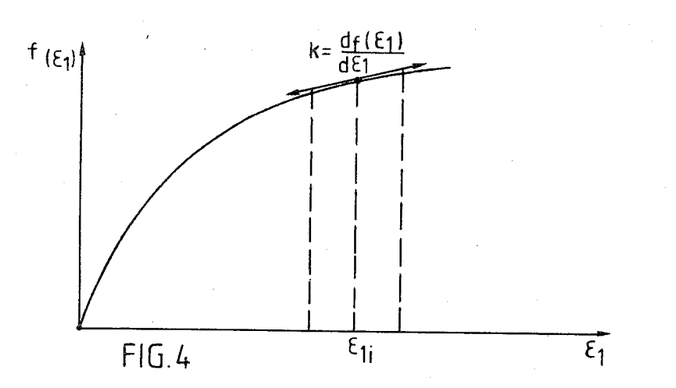
FIG. 4 is a curve of the function $f(\epsilon_1)$ as a function of address separation $\epsilon_1$.

FIG. 4 includes a curve representing an exemplary non-linear output function $f(\epsilon_1)$ of function generator GF in response to a set of input values $\epsilon_1$. From FIG. 4, the slope of the function relating $\epsilon_1$ to $f(\epsilon_1)$ is relatively large for small values of $\epsilon_1$, and relatively small for large values of $\epsilon_1$, i.e., the derivative $df(\epsilon_1)/d\epsilon_1$ is relatively large for small values of $\epsilon_1$, but the derivative is small for large values of $\epsilon_1$. It is also noted that the values of $f(\epsilon_1)$ and $\epsilon_1$ are related to each other as a monotonic, approximately exponential function.

Adder/comparator ADCOMP responds to the analog signals representing $f(\epsilon_1)$ and $-(v_m+\gamma)$ to derive a set or order acceleration signal $\gamma_c$ by linearly combining the outputs of function generator GF and MESVIT in accordance with $$\gamma_c = f(\epsilon_1) - (v_m + \gamma_F) = f(\epsilon_1) - v = f(\epsilon_1) + \epsilon_2 = -\epsilon_3/C_2 = -\overline{\gamma_c}/C_2.$$

Adder/comparator ADCOMP also responds to the $\overline{\epsilon_3}/C_2$ output signal of multiplier X, which is proportional to the current i in the coil of motor ML and therefore proportional to $\gamma$. Adder/comparator ADCOMP thus derives an error signal $\Delta(\epsilon_3/C_2) = (\epsilon_3 - \overline{\epsilon_3})/C_2 = (\gamma_c - \overline{\gamma})/C_2$. The error signal derived from adder/comparator ADCOMP is supplied as a control signal to voltage supply generator ALIM. In response to $\Delta(\epsilon_3/C_2)$ being positive and negative, supply generator ALIM respectively derives voltages $+U_0$ and $-U_0$ which are applied to the coil of linear electro-dynamic motor ML.

Figure 5:
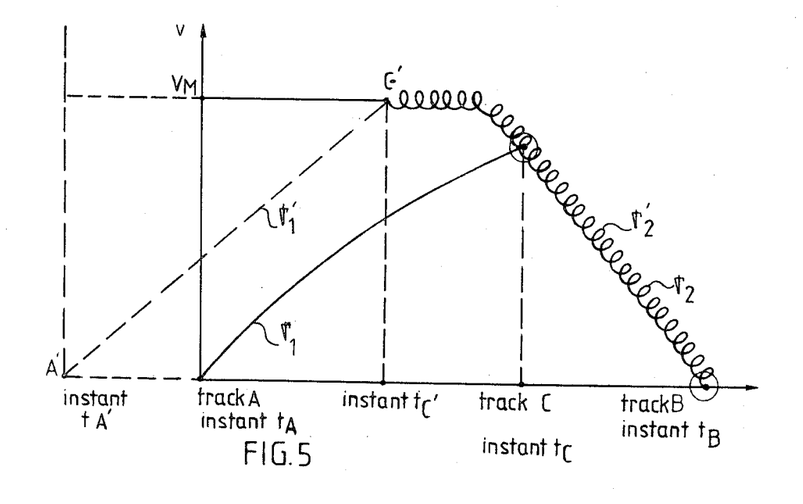
FIG. 5 is a curve of the speed of the movable system as a function of time.

Reference is now made to FIG. 5 of the drawing wherein the speed of movable system SYSMOB is plotted as a function of time while traversing between tracks A and B. Between track A and an intermediate track C, the coil of motor ML is permanetnly supplied with a positive voltage $+U_0$ in response to the output of generator ALIM, since the error signal $\Delta(\epsilon_3/C_2)$ derived by adder/comparator ADCOMP is positive throughout the interval. As illustrated in FIG. 5, between tracks A and B, during the intervals between times $t_A$ and $t_B$, head speed v, as represented by curve $r_1$, is approximately of exponential form, with the head speed remaining less than speed $v_m$. For sufficiently large values of $\epsilon_1$, it is estimated that at each abscissa point, such as abscissa point $\epsilon_{1i}$ (FIG. 4), $f(\epsilon_1)$ has a relatively small value, represented by:

$$f(\epsilon_1) = a + a''_1, \quad (4)$$

where $\alpha = df(\epsilon_1)/d\epsilon_1$, and $\alpha$ is a very small value. The movement of movable system SYSMOB is controlled by a differential equation of the form:

$$\epsilon_2 + 1/C_2 \cdot d\epsilon_2/dt = \text{constant}. \quad (5)$$

The solution of Equation (5) is of the type:

$$\epsilon_2 = B_1(1 - e^{-C_2 t}), \quad (6)$$

where $B_1$ is a constant. Thereby, between tracks A and C, the movement of system SYSMOB is speed regulated.

As head TEL approaches track B, where there are smaller deviations of address $\epsilon_1$, and the value of the error signal $\Delta(\epsilon_3/C_2)$ is changing polarity, the approximation given by Equation (4) is no longer valid. Thereby, the movement of system SYSMOB is defined by the non-linear second order differential Equation (1), supra. Because of the changing polarity of error signal $\Delta(\epsilon_3/C_2)$, the output of generator ALIM varies between $+U_0$ and $-U_0$. Therefore, after track C has been passed, i.e., after time $t_C$, the speed versus time curve of system SYSMOB is represented by curve $r_2$. The trajectory of curve $r_2$ corresponds to the non-linear second order differential Equation (1) and is approximated as a cylindrical helix having an axis extending along approximately a straight line between times $t_C$ and $t_B$, i.e., in the interval between the intermediate and final track positions.

In FIG. 5 is also shown a curve of the speed v of system SYSMOB as a function of time for a situation where the starting address A' is removed by a greater extent from the starting address than, for the situation indicated by curve $r_1$. Such a situation is indicated by curves $r'_1$ and $r'_2$. Curve $r'_1$ indicates the speed versus time trajectory of system SYSMOB between point A' and intermediate point C', for the modified situation, while curve $r'_2$ represents the trajectory between tracks C' and B.

Figure 6:
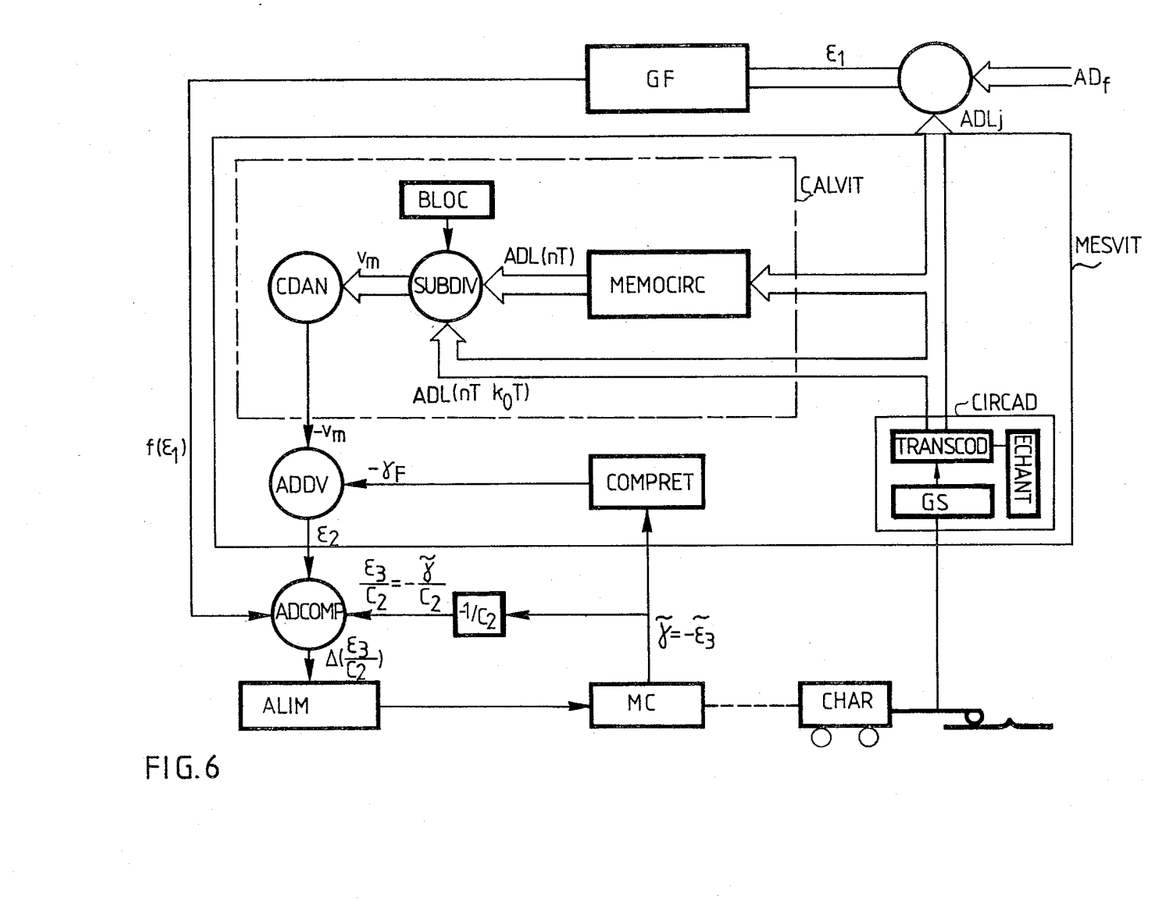
FIG. 6 is a more detailed block diagram of the speed measuring device according to the invention.

Reference is now made to FIG. 6 of the drawing wherein the details of circuit CIRCAD are illustrated as including threshold circuit GS responsive to the analog output signal of head TEL. Threshold circuit GS derives a serial binary signal that is supplied to converter register TRANSCOD, also responsive to sampling pulses derived from sample generator ECHANT, from which pulses are derived every T seconds, to define the sampling times.

Threshold circuit GS responds to output signal ST of head TEL, to transform the analog pulses in signal ST into a set of logic pulses. To this end, threshold circuit GS includes a pair of thresholds $S_1$ and $S_2$, which are a function of the absolute value of the average amplitude of the signals derived by head TEL for binary one bits in the interval under consideration.

It is recalled, by reference to FIG. 2, that a binary one is represented at the output of head TEL by two opposite polarity pulses, while a binary zero is represented at the head output as a zero amplitude. Thresholds $S_1$ and $S_2$ are respectively set equal to 0.25 AMP and 0175 AMP, where AMP is the average absolute magnitude of the amplitude of each pulse derived for a binary one output of head TEL.

Circuit GS determines the value of bits derived by head TEL while the head is in the reference zone by comparing the output signal of the head with the set threshold values. Because addresses are written in the reference zones in Gray code, a head TEL that perfectly straddles a pair of reference zones derives, for corresponding cells of adjacent track addresses, one of three values, namely a zero level, a maximum level, approximately AMP, and an intermediate level, approximately 0.5 AMP. For any particular pair of adjacent track addresses being read by head TEL, only one cell can be associated with signals of approximately 0.5 AMP; all of the remaining voltages derived from the head, for a particular pair of adjacent reference zones, must be approximately zero or approximately AMP. The approximately zero and approximately AMP values read from head TEL respectively occur for cells having zero and one values; thus, in FIG. 1e, voltages of zero or AMP are derived from all of the cells, except for the last cell. For correspondingly numbered cells of adjacent reference zones that differ from each other, the output of head TEL is approximately 0.5 AMP. This is the situation of the binary one and binary zero values for the last cells of zones $ZRP_{124}$ and $ZRP_{125}$, FIG. 1e.

If corresponding bits $B_{kj}$ and $B_{k(j+1)}$ of adjacent reference zones are both zero, the output signal ST of head TEL is zero, and therefore less than the threshold $S_1$. Circuit GS thus derives a binary zero output signal. The binary output signal is derived from circuit GS even if head TEL is not positioned so it exactly straddles axis $Ax_j$, between adjacent reference zones $ZRP_{ij}$ and $ZRP_{i(j+1)}$, so long as the edges of the head are positioned anywhere between boundaries $Ax_{(j-1)}$ and $Ax_{(j+1)}$.

If corresponding cells in the addresses of reference zones $ZRP_{ij}$ and $ZRP_{(j+1)}$ both have a binary bit value of one, the output voltage of head TEL has a positive amplitude, followed by a negative amplitude. The positive and negative amplitudes have absolute values equal to AMP, which is greater than $S_2$. Circuit GS responds to the positive and negative amplitude pulses and the magnitude of $S_t$ to derive a binary one value, regardless of the position of head TEL, as long as the edges of head TEL are positioned between axes $Ax_{(j-1)}$ and $Ax_{(j+1)}$.

If it is assumed that corresponding cells of the address of zones $ZRP_{ij}$ and $ZRP_{(j+1)}$ are respectively equal to one and zero, as occurs for one bit of a pair of adjacent reference zones, an ambiguity bit is detected by detector GS. The absolute value of the signal derived by head TEL for an ambiguity bit can vary continuously from zero to one hundred percent of AMP, depending upon the position of head TEL relative to axis $Ax_j$, as long as the edges of head TEL are confined between axes $Ax_{(j-1)}$ and $Ax_{(j+1)}$. In the extreme left position illustrated in FIG. 7, head TEL is positioned so that the center thereof is at position $POS_1$, midway between axes $Ax_{(j-1)}$ and $Ax_j$. In the intermediate position illustrated in FIG. 7, head TEL is located so that the center thereof is at position $POS_2$, on axis $Ax_j$. Head TEL can be moved to the extreme right position illustrated in FIG. 7, whereby the center of the head is coincident with position $POS_3$, which is halfway between axes $Ax_j$ and $Ax_{(j+1)}$. The distance between positions $POS_1$ and $POS_3$ is equal to the width of a zone $ZRP_{ij}$, which in turn is equal to the width 1p of a track. The distance 1p is also referred to as the pitch between tracks.

The amplitude of the signal derived from head TEL is dependent upon the location of the center of the head relative to positions $POS_1$ and $POS_3$. Let x represent the position of the center of head TEL, such that $x=0$ when the center of head TEL is at position $POS_1$ and $x=1$ when the center of head TEL is at position $POS_3$. The amplitude of the ambiguity bit is thus a function of x and is represented as A(x). Considering the situation of the two least significant bits in the addresses of FIG. 1e, wherein cell $C_{kj}$ has a value of zero and cell $C_{k(j+1)}$ has a value of one, it is seen that if x is less than 1p/4, A(x) is less than the threshold $S_1$, equal to 0.25 AMP. On the other hand, if x is greater than 3 1p/4, A(x) is greater than the maximum threshold, equal to 0.75 AMP. If x is between 1p/4 and 3 1p/4, A(x) is between the maximum and minimum thresholds $S_1$ and $S_2$, i.e., between 0.25 AMP and 0.75 AMP.

For the ambiguity situation, if one pulse for a particular cell has an amplitude greater than upper threshold $S_2$, the other pulse has an amplitude less than $S_1$. Detector GS responds to a pair of such pulses for a single cell, as well as to pulses between the thresholds $S_1$ and $S_2$ to derive binary values for the ambiguity bit such that if the amplitude of the two pulses is between the two thresholds, a binary weighted value $a_{-1}(j)$ value of one is derived. If, however, the value of one pulse is less than the lower threshold and the value of the other pulse within a cell is above the upper threshold, the binary weighted value $a_{-1}(j)$ value is assumed to be zero.

The pulses derived by detector GS are supplied to converter TRANSCOD, which responds to the Gray coding of the pulses to derive address $ADG_j$ or $ADG_{j+1}$. Converter TRANSCOD responds to the output of threshold circuit GS at a frequency of 1/T, equal to the frequency of the sampling pulses derived by a timing source (not shown) and supplied to sampling generator ECHANT. Converter TRANSCOD responds to the Gray coded pulses derived from detector GS to derive a weighted or standard binary coded signal. Converter register TRANSCOD therefore derives every T seconds, on a parallel output bus, the address $ADL_j$ in weighted binary code and supplies this signal to acceleration coefficient calculating network ACCEL. The output signal of converter register TRANSCOD responds to successive binary outputs of detector DS to derive address $ADL_{ji}$, such that $$ADL_j = a_{-1}(j).2^{-1} + a_0(j)2^0 + a_1(j)2^1 \ldots a_n(j)2^n, \quad (7)$$

where
$a_1(j), a_2(j) \ldots a_n(j) \in \{0, 1\}$,
weight $2^1 = 1p/2$.

From the foregoing, any position whatsoever of head TEL opposite the face of the disc with which it is associated can be represented by an address quantified as a half-step, i.e., half track width. Thus, if it is assumed that serial number j equals 124 and x is less than 1p/4, i.e., A(x) is less than $S_1$, head TEL occupies track 124. If, on the other hand, x is greater than 3 1p/4, whereby A(x) is greater than $S_2$, head TEL is located above track 125. If the value of x is between the thresholds $S_1$ and $S_2$, it is assumed that head TEL is above track 124.

If it is assumed that the final position of head TEL is such that the head is positioned directly on magnetic axis $Ax_f$ of address $AD_f$, $$AD_f = 1.2^{-1} + a_0(f)2^0 + \ldots a_n(f)2^n, \quad (8)$$

where $a_0(f), a_1(f) \ldots a_n(f)$ belong to $\{0, 1\}$.

The separation $\epsilon_1 = AD_f - ADL_j$, expressed as a half step, can be calculated in binary form as:

$$\epsilon_1 = \epsilon_{1-1}(j).2^{-1} + \epsilon_{10}(j).2^0 + \epsilon_{11}(j)2^1 = \epsilon_{1n}(j)2^n, \quad (9)$$

where $\epsilon_{1i}(j)$ $\{0, 1\}$.

The accuracy with which the position of head TEL can be determined and of the separation $\epsilon_1$ equals 1p/2−q.

Network CALVIT for calculating the speed of head TEL, $v_m$, includes, as illustrated in FIG. 6, a circulating memory MEMOCIRC responsive to the parallel binary signal derived from circuit CIRCAD, in combination with a selectively inhibited binary subtractor-divider SUBDIV which periodically supplies a binary signal representing $v_m$ to digital to analog converter CDAN which derives an analog signal having a magnitude proportional to $v_m$ and a polarity opposite to that of the actual head speed. In addition, network CALVIT includes an inhibiting device BLOC which normally prevents the derivation of output signal $v_m$ from subtractor-divider SUBDIV, except once every T seconds when an enabling signal is supplied by inhibiting device BLOC to the subtractor-divider. Circulating memory MEMOCIRC is supplied every T seconds with address $ADL(nT+k_0T)$ and supplies the address $ADL(nT)$ to subtractor-divider SUBDIV. Subtractor-divider SUBDIV is also responsive to the address $ADL(nT+k_0T)$. Circulating memory MEMOCIRC retains all of the values of addresses read between times $(nT)$ and $(nT+k_0T)$. Thus, all of the addresses $ADL(nT)$, $ADL(nT+2T) \ldots ADL(nT+k_0T)$ are serially stored in memory MEMOCIRC as read. Subtractor-divider SUBDIV calculates the speed value $v_m$ by determining the difference $ADL(nT+k_0T)-ADL(nT)$ and by dividing the difference by the quantity $k_0T$. Subtractor-divider SUBDIV performs these operations once each sampling interval, i.e., every T seconds. An output signal is derived from subtractor-divider SUBDIV at the same frequency that signals are supplied to the subtractor-divider by memory MEMOCIRC, by inhibiting the output of the subtractor-divider with output pulses from inhibiting network BLOC that is activated in synchronism once every T seconds, in synchronism with activation of memory MEMOCIRC.

Figure 8:
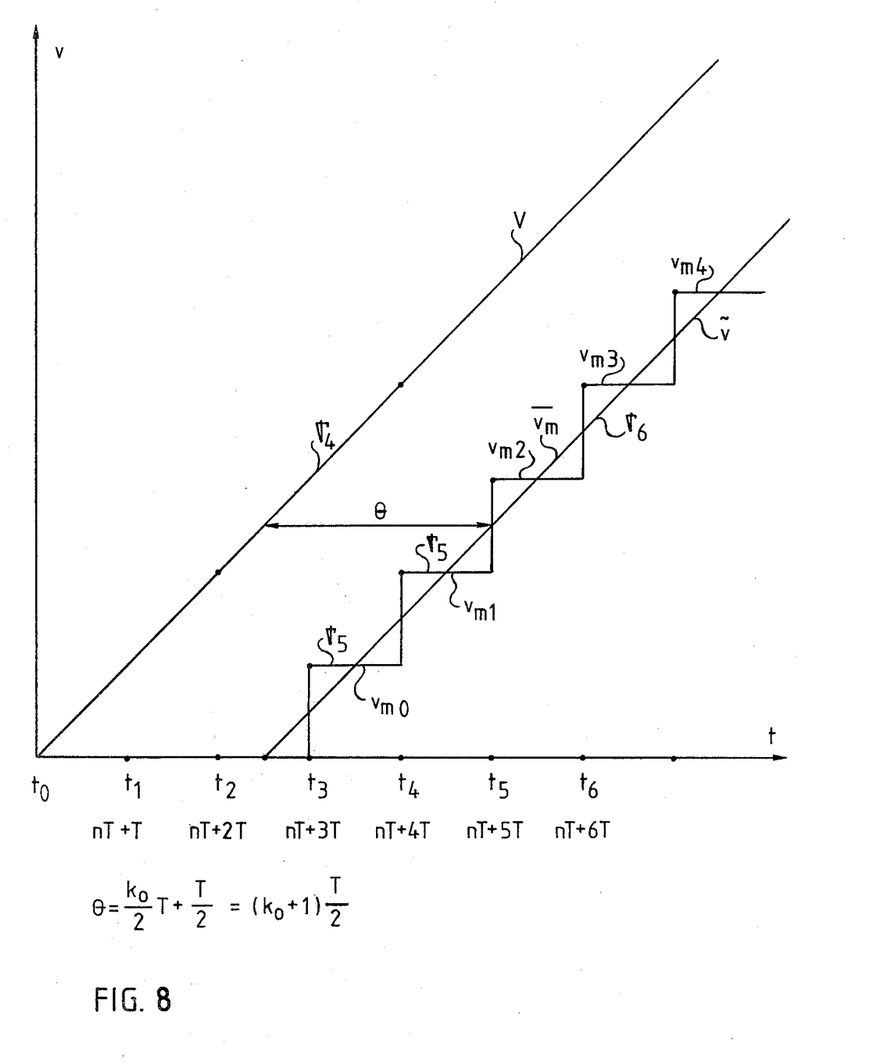
FIG. 8 is a diagram of estimated average measured speed, with an estimation delay $\theta$, with respect to actual speed of the movable system.

The average estimation delay $\theta$ is determined by relying upon the fact that the time interval separating sampling times $(nT)$ and $(nT+k_0T)$ is a sufficiently small interval (a few milliseconds) such that variation in the actual speed v of head TEL can be considered as a linear time function. The corresponding variation in the speed of head TEL as a function of time is illustrated in FIG. 8, wherein the symbols $t_0$, $t_1$, $t_2$, $t_3$, $t_4$, $t_5$, etcetera, respectively designate the sampling times $(nT)$, $(nT+T)$, $(nT+2T)$, $(nT+3T)$, $(nT+4T)$, $(nT+5T)$, $(nT+6T)$, etcetera; it is assumed that $k_0$ equals 4. At time $t_4$, subtractor-divider SUBDIV calculates the value $v_{m1}=(ADL(nT+4T)-ADL(nT)/4T$. The calculated value of $v_{m1}$ is blocked for T seconds by inhibiting device BLOC, i.e., between times $t_4$ and $t_5$. At time $t_5$, the value $(ADL(nT+5T)-ADL(nT+T))/4T=v_{m2}$ is calculated. The calculated value of $v_{m2}$ is blocked for T seconds between times $t_5$ and $t_6$. Similarly, at time $t_6$, the speed $v_{m3}$ is calculated as $(ADL(nT+6T)-ADL(nT+2T))/4T$. The calculated value of $v_{m3}$ is blocked for T seconds between times $t_5$ and $t_6$. It is apparent that measured speed $v_m$ for times before $t_4$ and after $t_6$ is determined identically to that described for times between $t_4$ and $t_6$. The measured speed derived from network CALVIT is thus a series of steps, as represented by curve $r_5$, FIG. 8, with the average speed $\overline{v}_m$ being represented by a relatively straight line $r_6$. Because of the linear evolution of actual speed v as a function of time, the measured speed $v_m$ at times $t_1$, $t_2$, $t_3$, $t_4$, $t_5$, etcetera, equals the actual speed v measured at the time $(nT+k_0T/2)$. This fact can be verified by comparing curves $r_4$ and $r_5$, FIG. 8. Thereby, the speed measured at time $t_4$ is equal to the actual speed at time $t_2$, such that $t_2=(t_4+t_0)/2=t_0+(t_4-t_0)/2=t_0+k_0T/2=t_0+2T$. This correlation between measured and actual speed results from the fact that when the speed evolves linearly as a function of time, the average speed between two times equals the measured speed at the middle of the time interval separating a pair of sampling times. Because the value of average speed $\overline{v}_m$ is blocked for T seconds, it is clearly seen, particularly from FIG. 8, that the average estimated delay $\theta=k_0T/2+T/2=(k_0+1)T/2$.

The optimum value of $k_0$ is determined from the known relationship that $v_m=1q/k_0T$ and that the accuracy with which the quantity 1q is determined is equal to the value of q. Thereby, a quantification error $\epsilon_q$ exists in determining the measured speed $v_m$, which quantification error is equal to $q/k_0T$. To the quantification error $\epsilon_q$ is added an error $\epsilon_\theta$ due to the average estimation delay $\theta=(k_0+1)T/2$. The result is that the absolute value of $\epsilon_\theta$ is equal to the absolute value of $\gamma\cdot\theta$, whereby, in effect, $\gamma=dv/dt$, i.e., $dv=dt$. If a function Q, known as a "cost function" is defined such that $Q=\epsilon_q+\epsilon_\theta$, there exists a value $k_0=1/T\sqrt{2q//\gamma/}$, to minimize the cost function. It is found that $k_0 4$ in the described embodiment.

While there have been described and illustrated several specific embodiments of the invention, it will be clear that variations in the details of the embodiments specifically illustrated and described may be made without departing from the true spirit and scope of the invention as defined in the appended claims.

I claim:

1. Apparatus for measuring the speed of a movable system with respect to a carrier for data recorded on a plurality of tracks having addresses written on the carrier in a plurality of reference zones, the number of reference zones being at least equal to the number of tracks, each track being associated with at least one zone, the recorded data being read by a data read head, the apparatus comprising: means responsive to the recorded data read by the head for determining the address read by the head at predetermined sampling times, means responsive to the address read by the head at the sampling times for calculating the speed v of the system as a function of the difference between the addresses read by the head at sampling times separated by predetermined time intervals, the means for calculating the speed v of the movable system comprising means for calculating the measured speed $v_m$ of the system as a function of the difference between the addresses $ADL(nT+k_0T)$ and $ADL(nT)$ read by the head at the sampling times $t_{k0}=nT+k_0T$ and $t_n=nT$, n and $k_0$ being integers, the sampling times $t_{k0}$ and $t_n$ being separated by time intervals equal to T seconds, said calculating means deriving a signal having an amplitude representing $v_m$, means for compensating the average estimation delay $\theta$ of the measured speed $v_m$ with respect to the speed v of the system and for deriving a compensation signal $\gamma_F$, signal combining means responsive to the measured speed representing signal and the compensation signal $\gamma_F$ for deriving a signal having a magnitude representing $(v_m+\gamma_F)$ that is more substantially equal to the actual speed of the movable system than $v_m$.

2. The apparatus of claim 1 wherein the measured speed calculating means comprises: means for storing signals representing the addresses $ADL(nT+k_0T)$ and $ADL(nT)$, and means for calculating the difference between the stored addresses to derive a difference signal and for dividing the magnitude of the difference signal by $k_0T$ so as to derive the signal representing measured speed $v_m$.

3. The apparatus of claim 1 or 2 wherein the means for compensating and responsive to measured acceleration $\overline{\gamma}$ of the system has a transfer function G filter such that $\overline{\gamma}\times G=\gamma_F$.

4. The apparatus of claim 1 or 2 wherein the track addresses are written on the carrier in a first binary code and the means for determining the address read by the head comprises: a threshold circuit for transforming a set of analog pulses derived by the read head into a first binary signal representing the read address, the first binary signal being represented as $ADG_j$ in the first code, a converter register for converting the address $ADG_j$ in the first code into a second binary signal, the second binary signal being in a second binary code represented as $ADL_j$, a sampling generator for deriving sampling pulses that determine the said sampling times, said sampling pulses being supplied to the converter register to control the register so the register derives the second binary signal at the sampling times, and the register converter supplies the second signal to the calculating means at the sampling times.

5. The apparatus of claim 1 or 2 wherein the signal representing $v_m$ is a binary signal and the compensation signal is an analog signal, means for converting the binary signal representing $v_m$ into an analog signal, said means for deriving the signal having a magnitude representing $(v_m + \gamma_F)$ including means for linearly combining the analog signal representing $v_m$ and the compensation signal.

6. In combination, a magnetic disc having a plurality of concentric data tracks, each track including at least one reference zone, each reference zone including an address, a magnetic read head for data in the tracks, means for rotating the disc relative to the head and for translating the head radially relative to the disc, means for sampling addresses read by the head at predetermined sampling times, and means responsive to the sampled read addresses and the time interval between the sampled read addresses for determining the speed v of the head relative to the disc, the means for calculating the speed v of the head comprising means for calculating the measured speed $v_m$ of the head as a function of the difference between the addresses $ADL(nT=k_0T)$ and $ADL(nT)$ and $t_n=nT$, n and $k_0$ being integers, the sampling times $t_{k_0}$ and $t_n$ being separated by time intervals equal to T seconds, said calculating means deriving a signal having an amplitude representing $v_m$, means for compensating the average estimation delay $\theta$ of the measured speed $v_m$ with respect to the speed v of the head and for deriving a compensation signal $\gamma_F$, signal combining means responsive to the measured speed representing signal and the compensation signal $\gamma_F$ for deriving a signal having a magnitude representing $(v_m + \gamma_F)$ that is more substantially equal to the actual speed of the movable system than $v_m$.

7. The combination of claim 6 wherein the measured speed calculating means comprises: means for storing signals representing the addresses $ADL(nT+k_0T)$ and $ADL(nT)$, and means for calculating the difference between the stored addresses to derive a difference signal and for dividing the magnitude of the difference signal by $k_0T$ so as to derive the signal representing measured speed $v_m$.

8. The combination of claim 6 or 7 wherein the means for compensating and responsive to measured acceleration of the system has a transfer function G filter such that $\gamma \bar{\gamma} \times G = \gamma_F$.

9. The combination of claim 6 or 7 wherein the track addresses are written on the carrier in a Gray code and the means for determining the address read by the head comprises: a threshold circuit for transforming a set of analog pulses derived by the read head in a first binary signal being represented as $ADG_j$ in the first code, a converter register for converting the address $ADG_j$ in the first code into a second binary signal, the second binary signal being in a weighted binary code represented as $ADL_j$, a sampling generator for deriving sampling pulses that determine the said sampling times, said sampling pulses being supplied to the converter register to control the register so the register derives the second binary signal at the sampling times, and the register converter supplies the second signal to the calculating means at the sampling times.

10. The combination of claim 6 or 7 wherein the signal representing $v_m$ is a binary signal and the compensation signal is an analog signal, means for converting the binary signal representing $v_m$ into an analog signal, and means for deriving the signal having a magnitude representing $(v_m + \gamma_F)$ including means for linearly combining the analog signal representing $v_m$ and the compensation signal.

* * * * *